US012665359B2

(12) United States Patent
Craig, IV

(10) Patent No.: US 12,665,359 B2
(45) Date of Patent: Jun. 23, 2026

(54) CONNECTORIZED MASS INTERCONNECT

(71) Applicant: Honeywell Federal Manufacturing & Technologies, LLC, Kansas City, MO (US)

(72) Inventor: William Oliver Craig, IV, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 364 days.

(21) Appl. No.: 18/135,303

(22) Filed: Apr. 17, 2023

(65) Prior Publication Data

US 2024/0347987 A1 Oct. 17, 2024

(51) Int. Cl.

| | |
|---|---|
| ***H01R 24/00*** | (2011.01) |
| ***H01R 13/512*** | (2006.01) |
| ***H01R 13/627*** | (2006.01) |
| ***H01R 107/00*** | (2006.01) |

(52) U.S. Cl.

CPC ........... *H01R 24/00* (2013.01); *H01R 13/512* (2013.01); *H01R 13/6273* (2013.01); *H01R 2107/00* (2013.01)

(58) Field of Classification Search

CPC ......................... H01R 13/512; H01R 13/6273; H01R 13/631; H01R 13/621; H01R 13/6215; H01R 24/00; H01R 2107/00

USPC ......................... 439/639, 377, 380, 381, 364

See application file for complete search history.

(56) References Cited

U.S. PATENT DOCUMENTS

| | | | | |
|---|---|---|---|---|
| 4,597,618 A * | 7/1986 | Reimer | H01R 24/20 | 439/364 |
| 5,035,627 A | 7/1991 | Burnett et al. | | |
| 5,556,288 A * | 9/1996 | Ishii | H01R 13/6215 | 439/135 |
| 5,599,200 A * | 2/1997 | Yagi | H01R 13/6215 | 439/364 |
| 6,572,412 B2 * | 6/2003 | Beuther | H05K 5/0069 | 439/83 |
| 7,281,939 B1 * | 10/2007 | Stock | H01R 13/4361 | 439/364 |
| 2003/0162434 A1 * | 8/2003 | Kamiya | H05K 13/0456 | 439/381 |
| 2004/0002249 A1 * | 1/2004 | Yamada | H01R 12/714 | 439/364 |
| 2006/0205264 A1 * | 9/2006 | Katsuma | H01R 13/4538 | 439/381 |

(Continued)

OTHER PUBLICATIONS

Pickering Connect s.r.o. Breadboard Blocks. Webpage, 2021, 2 pages. <https://pickeringconnect.com/breadboard-blocks>.

(Continued)

*Primary Examiner* — Gary F Paumen

(74) *Attorney, Agent, or Firm* — Hovey Williams LLP

(57) ABSTRACT

A connectorized mass interconnect guide for interfacing a mass interconnect having a plurality of connector pins with a plurality of commercial off-the-shelf (COTS) cables. The connectorized mass interconnect guide broadly comprises a body and a number of partitions forming a number of apertures. The partitions divide connector pins into a number of connector pin sets when the body abuts the mass interconnect. The apertures expose the connector pin sets for receiving the COTS cables being connected to the connector pin sets.

17 Claims, 6 Drawing Sheets

(56) References Cited

U.S. PATENT DOCUMENTS

2015/0056845 A1* 2/2015 Tanaka .................. H05K 5/006
439/377

OTHER PUBLICATIONS

Eiger Design GmbH. Pylon Mass Interconnect. Webpage, 2021, 3 pages .<http://www.eigerdesign.com/system-pylon-mass-interconnect.html>.

Gary Clayton. Modular Mass Interconnect Solutions for LXI. Nordic Test Forum. Article, Nov. 2009, 21 pages.

* cited by examiner

CONNECTORIZED MASS INTERCONNECT

GOVERNMENT INTERESTS

This invention was made with Government support under Contract No.: DE-NA-0002839 awarded by the United States Department of Energy/National Nuclear Security Administration. The Government has certain rights in the invention.

BACKGROUND

Mass interconnects act as a connector interface between test instruments and electronic devices or “units under test”. Mass interconnects often include large, difficult to manage wire bundles, direct or custom wirings, or intermediate circuit boards, which increase total number of connections and degrades signal integrity. Wires are often incorrectly connected to mass interconnects, which is difficult and time consuming to troubleshoot. Furthermore, connector pins of mass interconnects are easily damaged during custom wiring and subsequent use.

SUMMARY OF THE INVENTION

Embodiments of the present invention solve the above-mentioned problems and provide a distinct advance in the art of mass interconnects. More particularly, the present invention provides a connectorized mass interconnect guide that facilitates direct, orderly connections between commercial off-the-shelf (COTS) cables and a mass interconnect.

An embodiment of the connectorized mass interconnect guide overlays or abuts the mass interconnect to ensure COTS cables are properly and correctly connected to the mass interconnect and broadly comprises a body and a number of partitions.

The body includes opposing first and second sides. The first side is configured to abut a frame of the mass interconnect and may have geometric features complementary to geometric features of the frame of the mass interconnect. The second side may be flat or ergonomically shaped.

The partitions extend between sides of the body and/or other partitions such that the partitions and the body form a number of apertures. Additional or other partitions may be used depending on the desired pin sets to be made available.

A first partition extends between long sides of the body and may have a first width greater than widths of the other partitions. The first partition may coincide with a gap in pins of the mass interconnect and thus may primarily cover the gap. Nevertheless, the first partition divides the connector pins into certain connector pin sets. Additional partitions further divide the connector pins into connector pin sets.

The apertures extend through the body between the first and second sides and expose connector pin sets when the body of the connectorized mass interconnect guide abuts the frame of the mass interconnect. The apertures are shaped to receive heads of the COTS cables therein.

The body may further define cavities in the second side. The cavities are configured to receive some of the connector pins that are not grouped into one of the connector pin sets. The body thereby at least partially obscures the connector pins received in the cavities so that they cannot be engaged by the COTS cables and do not need to be removed.

The above-described connectorized mass interconnect guide facilitates orderly connection of COTS cables to a mass interconnect. To that end, the connectorized mass interconnect guide divides connector pins of the mass interconnect into connector pin sets and provides apertures for correctly connecting the COTS cables to the appropriate connector pin sets without the need for a PCB, soldering, re-wiring, adaptors, or makeshift solutions. The apertures and partitions provide discrete, un-mistakable connection points and eliminate unruly entanglements of wires and connections. Furthermore, the connectorized mass interconnect guide eliminates the need to modify or customize the mass interconnect or design customized connectors.

The connectorized mass interconnect guide also eliminates the need for intermediate circuit boards or additional connections, which helps maintain signal integrity and reduces the likelihood of connection failures and incorrect wirings. The connectorized mass interconnect guide also prevents damage to connector pins of the mass interconnect by forcing the COTS cables to be aligned with the connector pins prior to and during connection. Furthermore, the connectorized mass interconnect guide can be customized before use according to a desired wiring plan so that wiring decisions do not have to be made during wiring.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
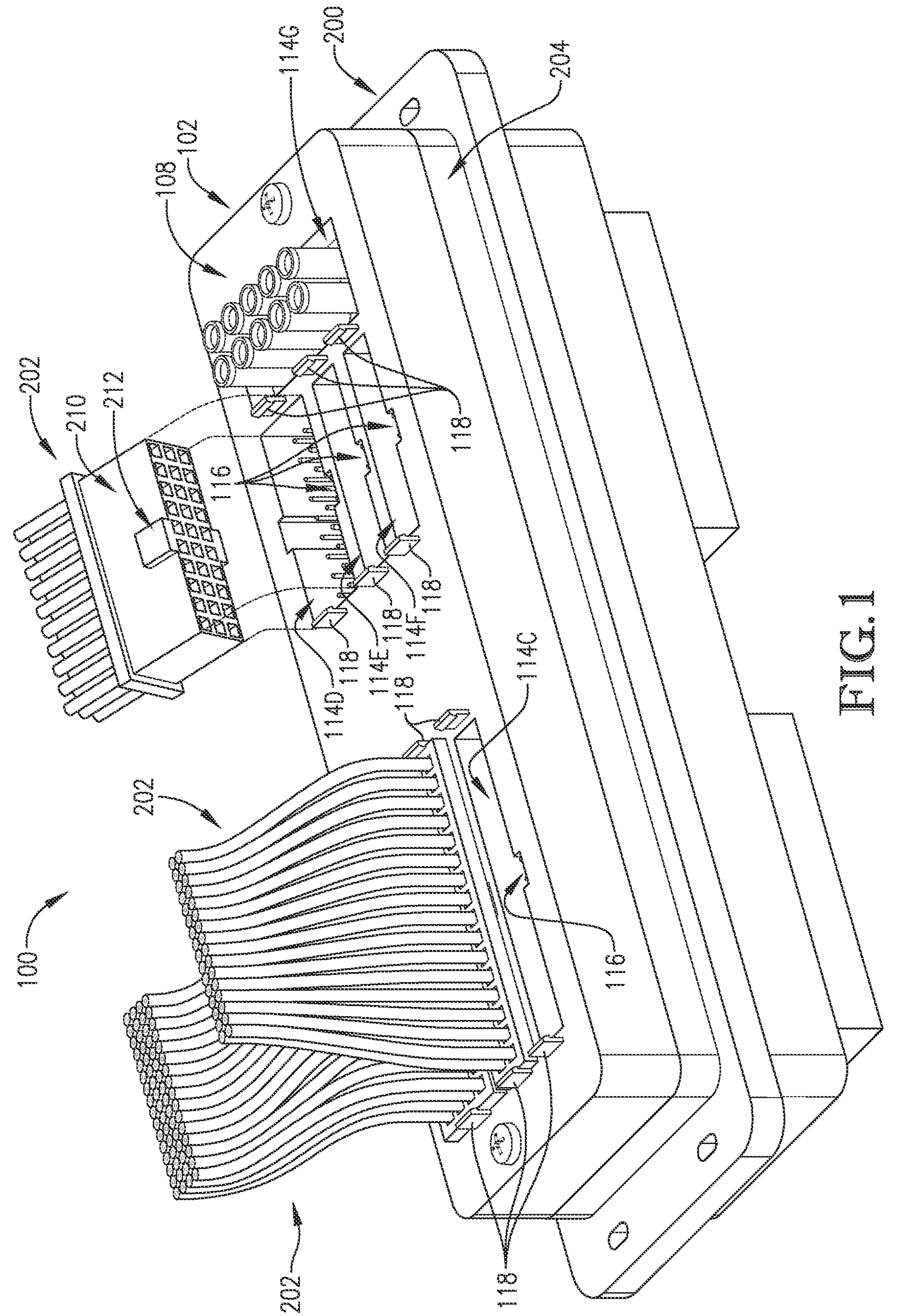
FIG. 1 is a perspective view of a connectorized mass interconnect guide constructed in accordance with an embodiment of the invention.
Figure 2:
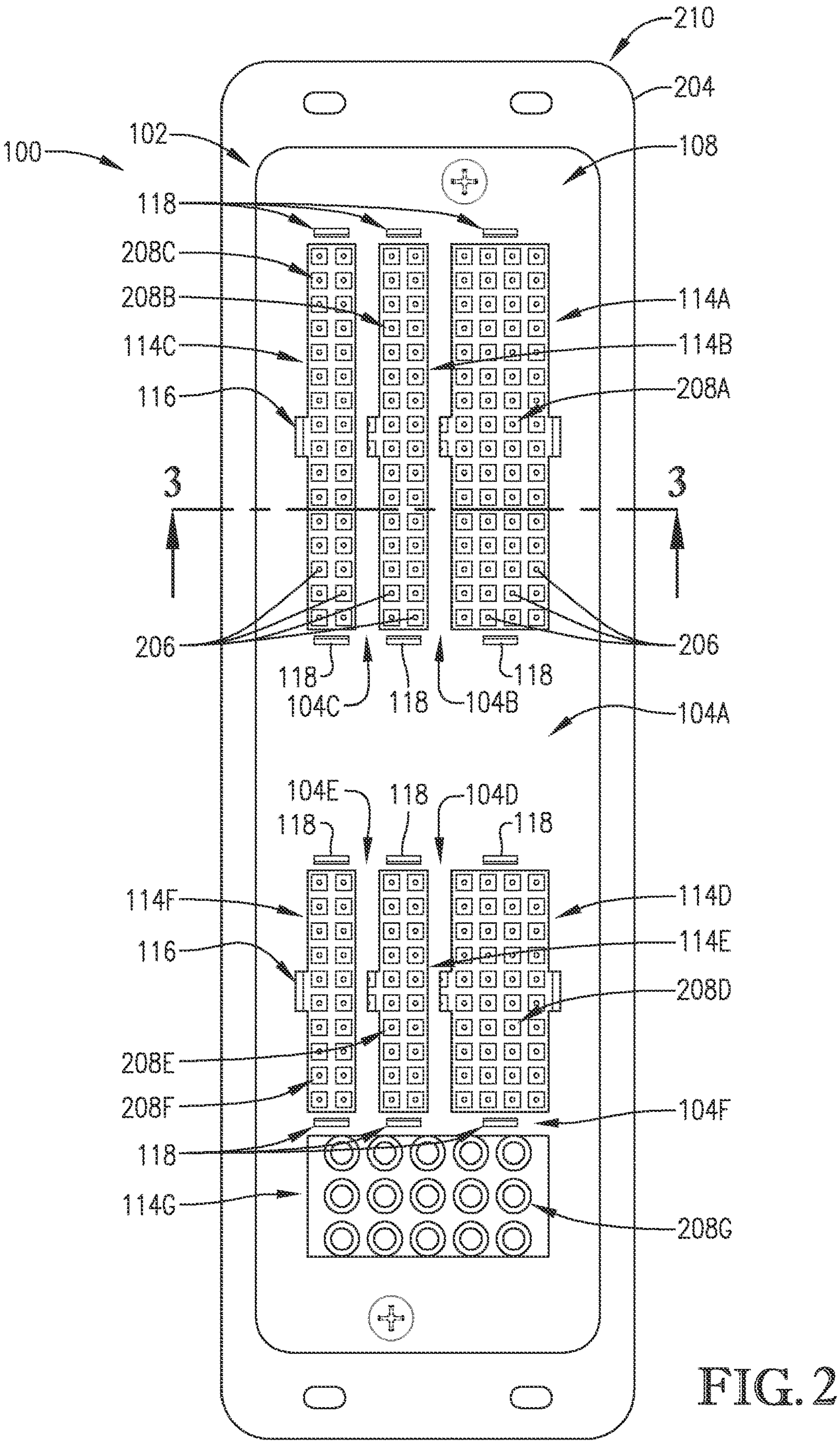
FIG. 2 is a top plan view of the connectorized mass interconnect guide of FIG. 1.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

Turning to the drawing figures, a connectorized mass interconnect guide 100 constructed in accordance with an embodiment of the invention is illustrated. The connectorized mass interconnect guide 100 overlays or abuts a mass interconnect 200 to ensure COTS cables 202 are properly and correctly connected to the mass interconnect 200. The connectorized mass interconnect guide 100 broadly comprises a body 102 and a plurality of partitions 104A-F.

The body 102 includes opposing first and second sides 106, 108. The first side 106 is configured to abut a frame 204 of the mass interconnect 200. To that end, the first side 106 may be flat or may have geometric features 110 complementary to geometric features of the frame 204 of the mass interconnect 200. Alternatively the geometric features 110 may include apertures. The second side 108 may be flat or ergonomically shaped. The second side 108 may also have symbols or indicators identifying specific ports for the plurality of COTS cables 202. In one embodiment, the body 102 has a rectangular cuboid shape, but the body 102 may take other shapes. The body may include a plurality of fastener holes 112 extending between the first and second sides 106, 108 for receiving screws, pins, or other fasteners therethrough and securing the connectorized mass interconnect guide 100 to the mass interconnect 200. The body 102 may be formed via additive manufacturing (e.g., 3D printing), injection molding, machining, or any other suitable manufacturing technique. The body 102 may be at least partially plastic, metal, composites, or any other suitable material.

The plurality of partitions 104A-F extend between sides of the body 102 and/or other partitions 104A-F such that the plurality of partitions 104A-F and the body 102 form a plurality of apertures 114A-G. The partitions 104A-F will be described in terms of the connector pin sets 208A-G they form when the body 102 of the connectorized mass interconnect guide 100 abuts the frame 204 of the mass interconnect 200. Additional or other partitions may be used depending on the desired pin sets as described below.

Partition 104A extends between long sides of the body 102 and may have a first width greater than widths of the other partitions 104B-F. Partition 104A may coincide with a gap in pins of the mass interconnect 200 and thus may primarily cover the gap. Nevertheless, partition 104A divides connector pins 206 into connector pin sets 208A-C and 208D-F.

Partitions 104B, C extend between a short side of the body 102 and partition 104A. In one embodiment, partitions 104B,C extend perpendicular to partition 104A. Partition 104B divides connector pins 206 into connector pin sets 208A and 208B. Partition 104C divides connector pins 206 into connector pin sets 208B and 208C.

Partitions 104D, E extend between partition 104A and partition 104E. In one embodiment, partitions 104D,E extend perpendicular to partition 104A. Partition 104D divides connector pins 206 into connector pin sets 208D and 208E. Partition 104E divides connector pins 206 into connector pin sets 208E and 208F.

Partition 104F extends between long sides of the body 102. In one embodiment, partition 104F extends parallel to partition 104A. Partition 104F divides connector pins 206 into connector pin sets 208D, E,F and 208G.

The apertures 114A-G extend through the body 102 between the first and second sides 106, 108 and expose connector pin sets 208A-G when the body 102 of the connectorized mass interconnect guide 100 abuts the frame 204 of the mass interconnect 200. The apertures 114A-G are shaped to receive heads 210 of the COTS cables 202 therein. To that end, the apertures 114A-G may include alignment geometry 116 for receiving corresponding orientation structure 216 of the heads 210 of the COTS cables 202. The apertures 114A-G may have different sizes or shapes to accommodate different pin sizes or types and pin sets having different numbers of pins. For example, the apertures 114A-G may form/accommodate a 10 pin set, a 20 pin set, a 32 pin set, and a 64 pin set, and accommodate pins of at least two different sizes. The connector pins 206 may include 100 mil spacing (typical for many data and header connections) or any other suitable size or standard. The COTS cables 202 shown are exemplary and other COTS cables divided into two or more cables or combined into a single cable may be used.

In one embodiment, the connectorized mass interconnect guide 100 further comprises retainment structure 118 for releasably securing the COTS cables 202 in engagement with the connector pin sets 208. The retainment structure 118 may be resistive tabs, set screws, latches, or the like.

Figure 3:
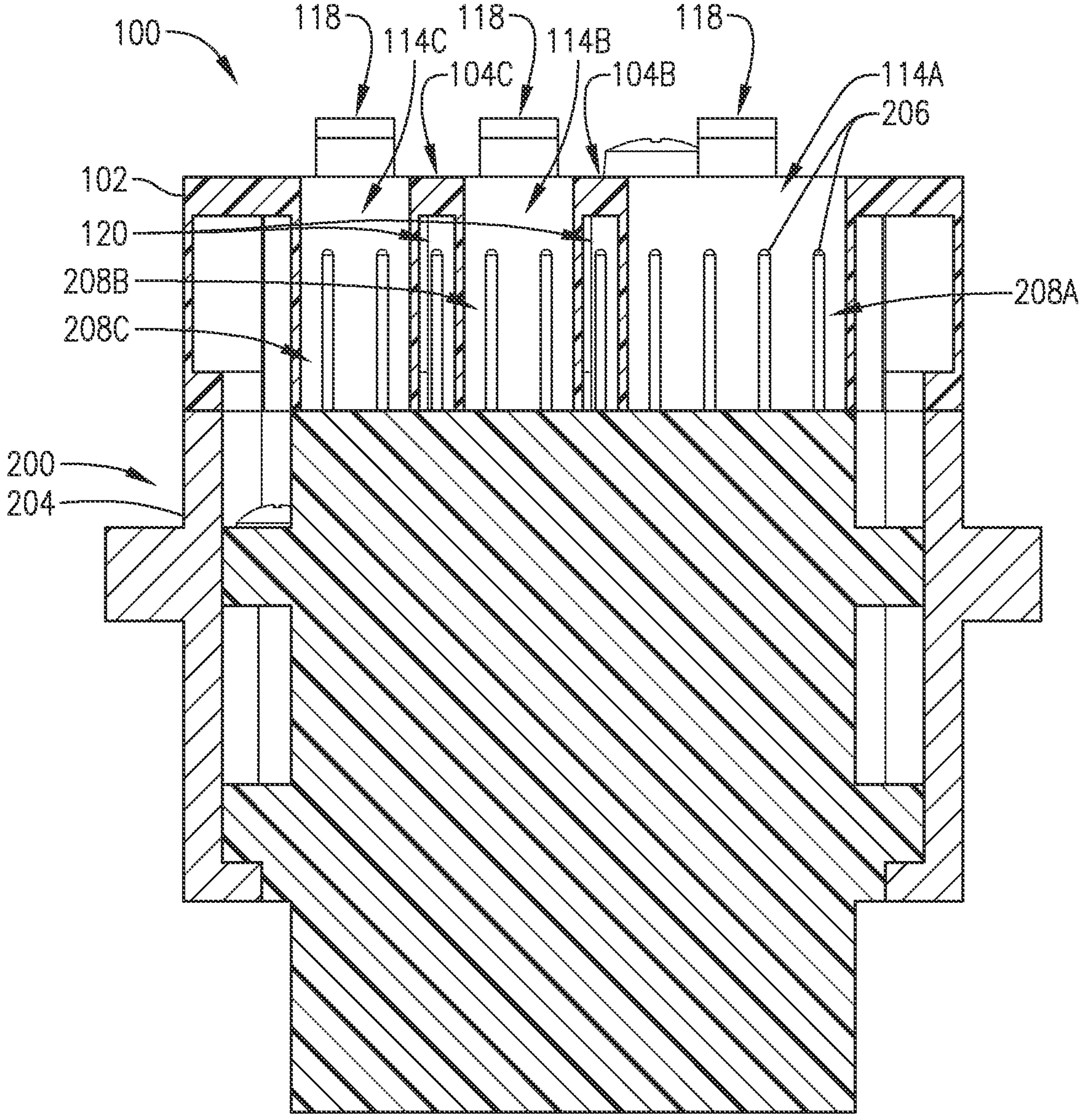
FIG. 3 is a cutaway elevation view of the connectorized mass interconnect guide along line 3-3 of FIG. 2.
Figure 4:
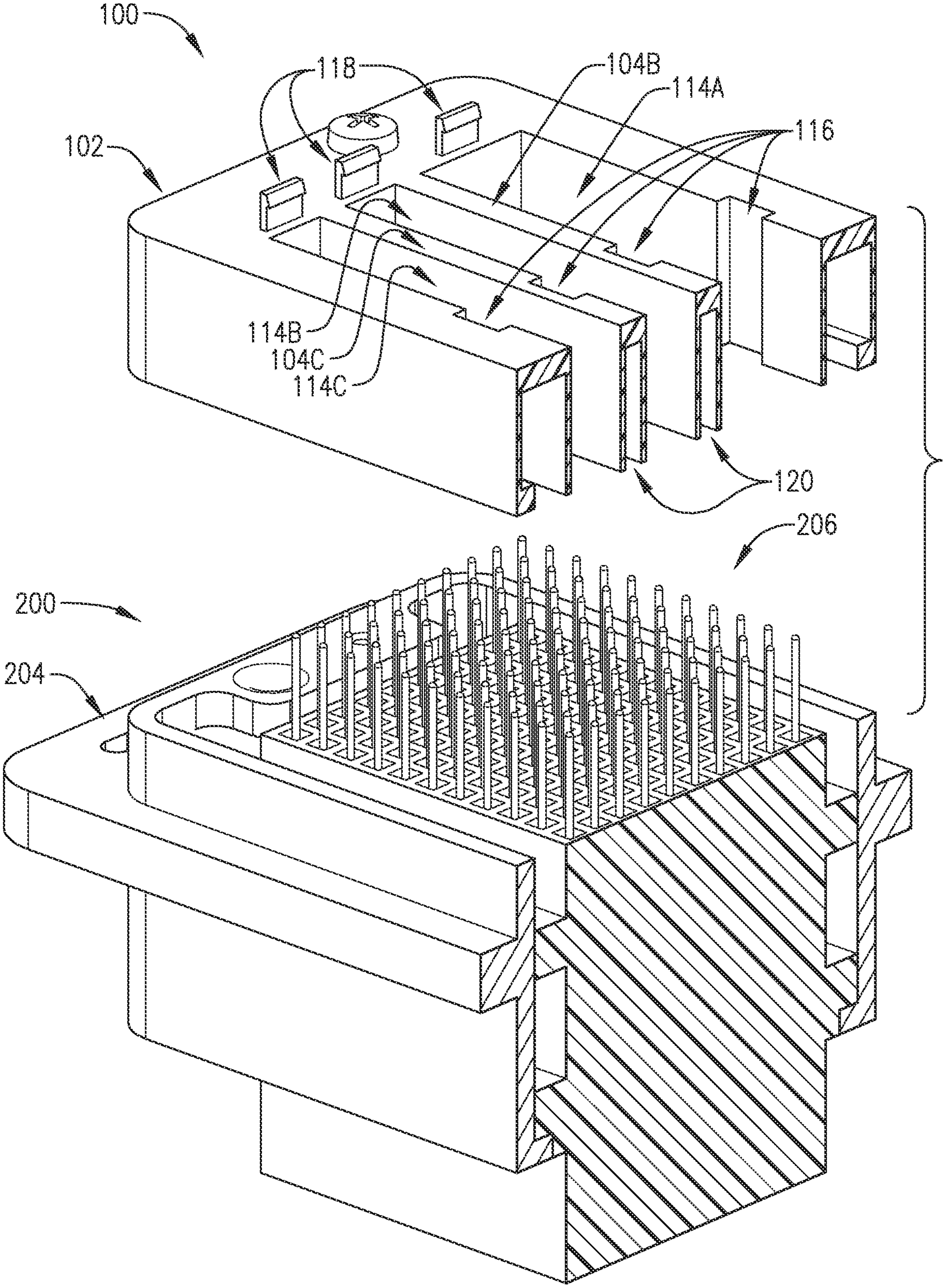
FIG. 4 is a perspective cutaway view of the connectorized mass interconnect guide of FIG. 1.
Figure 5:
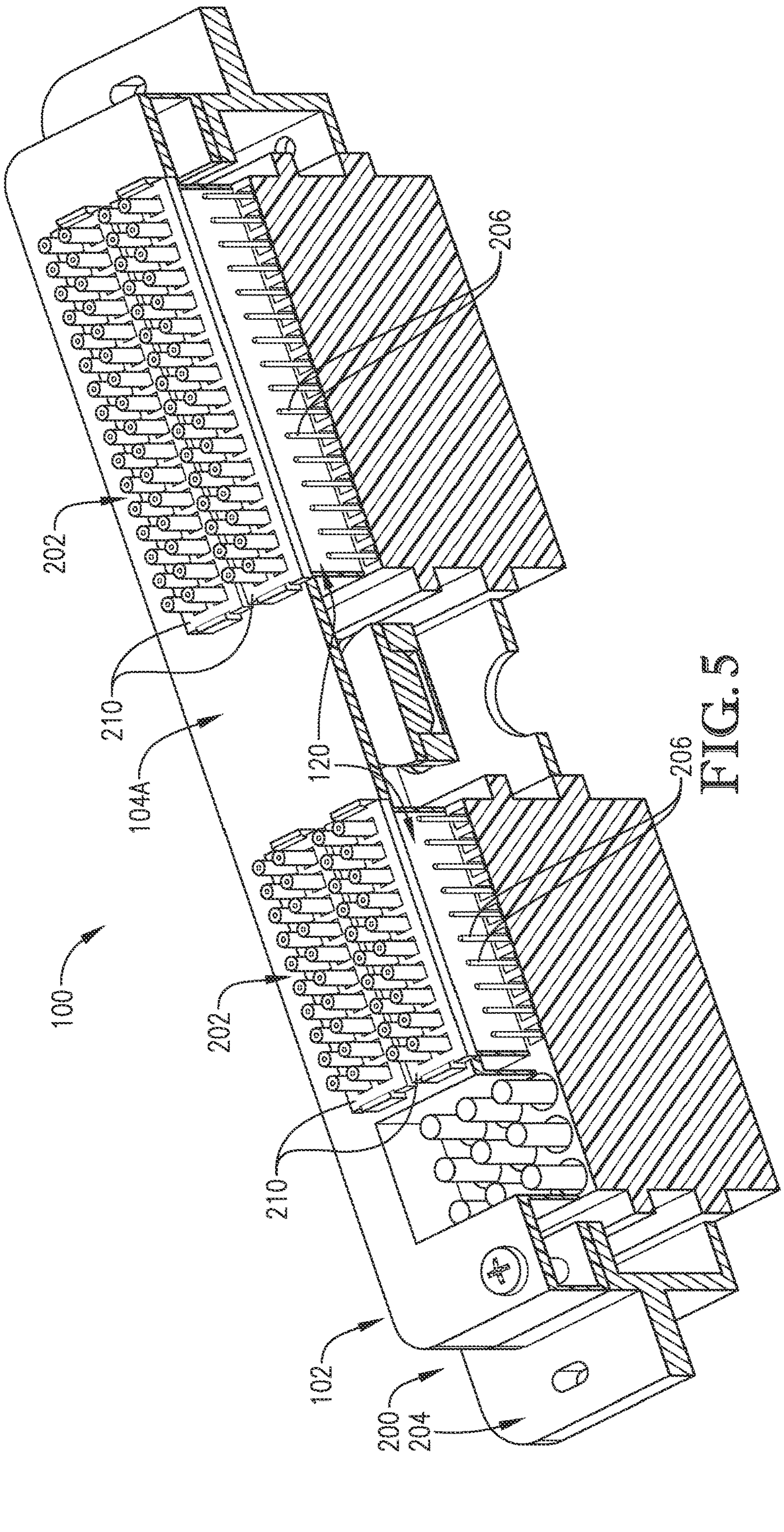
FIG. 5 is another perspective cutaway view of the connectorized mass interconnect guide of FIG. 1.
Figure 6:
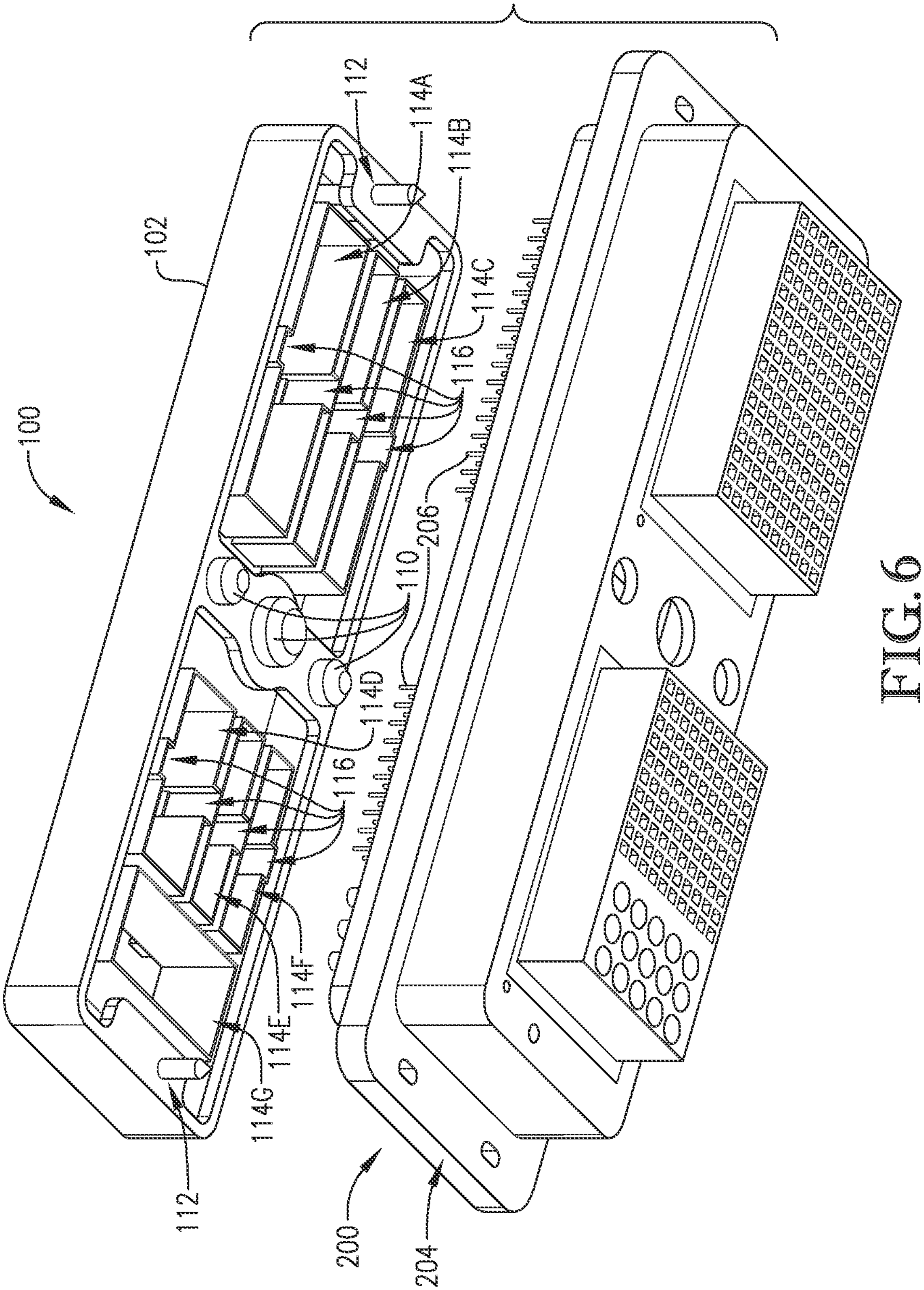
FIG. 6 is a bottom perspective view of the connectorized mass interconnect guide of FIG. 1.

In some embodiments, and as best seen in FIGS. 3-6, the body 102 (and more specifically, some of the partitions 104B-E) further defines cavities 120 in the second side 108. The cavities 120 are configured to receive some of the connector pins 106 that are not grouped into one of the connector pin sets 208A-G. The body 102 thereby at least partially obscures the connector pins 206 received in the cavities 120 so that they cannot be engaged by the COTS cables 202 (intentionally or accidentally) and do not need to be removed. Alternatively, these areas may be solid material with no cavities. In that case, some of the pins may be removed to accommodate the solid partitions.

The above-described connectorized mass interconnect guide 100 facilitates orderly connection of COTS cables 202 to a mass interconnect 200. To that end, the connectorized mass interconnect guide 100 divides connector pins 206 of the mass interconnect 200 into connector pin sets 208A-G and provides apertures 114A-G for correctly connecting the COTS cables 202 to the appropriate connector pin sets 208A-G without the need for a PCB, soldering, re-wiring, adaptors, or makeshift solutions. The apertures 114A-G and partitions 104A-F provide discrete, un-mistakable connection points and eliminate unruly entanglements of wires and connections. Furthermore, the connectorized mass interconnect guide 100 eliminates the need to modify or customize the mass interconnect 200 or design customized connectors. Instead, connector pins 206 and connector pin sets (e.g., connector pin sets 208A-G) just need to be given assignments.

The connectorized mass interconnect guide 100 also eliminates the need for intermediate circuit boards or additional connections, which helps maintain signal integrity and reduces the likelihood of connection failures and incorrect wirings. The connectorized mass interconnect guide 100 also prevents damage to connector pins 206 of the mass interconnect 200 by forcing the COTS cables 202 to be aligned with the connector pins 206 prior to and during connection. Furthermore, the connectorized mass interconnect guide 100 can be customized before use according to a desired wiring plan so that wiring decisions do not have to be made during wiring.

Additional Considerations

The description and drawings are illustrative and are not to be construed as limiting. Numerous specific details are described to provide a thorough understanding. However, in certain instances, well-known or conventional details are not described in order to avoid obscuring the description. References to one embodiment or an embodiment in the present disclosure are not necessarily references to the same embodiment; and, such references mean at least one.

The use of headings herein is merely provided for ease of reference, and shall not be interpreted in any way to limit this disclosure or the following claims.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A connectorized mass interconnect guide for interfacing a mass interconnect having a plurality of connector pins with a plurality of commercial off-the-shelf (COTS) cables, each of the plurality of connector pins including a distal end, the connectorized mass interconnect guide comprising:
- a body having:
  - a first side configured to abut the mass interconnect; and
  - a second side opposite the first side;
- a partition configured to divide the plurality of connector pins into a plurality of connector pin sets when the first side of the body abuts the mass interconnect,
- the body and the partition forming a plurality of apertures extending between the opposing first and second sides, each one of the plurality of apertures being configured to expose one of the connector pin sets and receive one of the plurality of COTS cables from the second side so that each one of the plurality of COTS cables connects with one of the plurality of connector pin sets,
- the body being configured to at least partially obscure more than one of the plurality of connector pins from the second side to prevent the plurality of COTS cables from engaging the obscured connector pins; and
- a cavity configured to retain the distal ends of at least two of the obscured connector pins therein when the connectorized mass interconnect guide interfaces the mass interconnect, the cavity being elongated in a direction extending between the at least two of the obscured connector pins.

2. The connectorized mass interconnect guide of claim 1, further comprising alignment geometry associated with one of the plurality of apertures, the alignment geometry being configured to receive orientation structure of one of the plurality of COTS cables thereby orienting the one of the plurality of COTS cables rotationally about a longitudinal axis of the one of the plurality of COTS cables.

3. The connectorized mass interconnect guide of claim 1, further comprising retainment structure configured to releasably secure one of the plurality of COTS cables in engagement with one of the plurality of connector pin sets.

4. The connectorized mass interconnect guide of claim 1, the partition being configured to divide the plurality of connector pins into at least a 32 pin set.

5. The connectorized mass interconnect guide of claim 1, the partition being configured to divide the plurality of connector pins into at least a 64 pin set.

6. The connectorized mass interconnect guide of claim 1, the partition being configured to divide the plurality of connector pins into at least a 20 pin set.

7. The connectorized mass interconnect guide of claim 1, the partition being configured to divide the plurality of connector pins into at least a 40 pin set.

8. The connectorized mass interconnect guide of claim 1, further comprising a plurality of fastener holes extending between the opposing first and second sides for receiving fasteners therethrough to secure the connectorized mass interconnect guide to the mass interconnect.

9. A connectorized mass interconnect guide for interfacing a mass interconnect having a plurality of connector pins with a plurality of commercial off-the-shelf (COTS) cables, each of the plurality of connector pins including a distal end, the connectorized mass interconnect guide comprising:
- a body having:
  - a first flat side configured to abut the mass interconnect; and
  - a second flat side opposite the first side;
- a plurality of partitions configured to divide the plurality of connector pins into a plurality of connector pin sets when the first side of the body abuts the mass interconnect,
- the body and the plurality of partitions forming a plurality of apertures extending between the opposing first and second sides, each one of the plurality of apertures being configured to expose one of the connector pin sets and receive one of the plurality of COTS cables from the second side so that each one of the plurality of COTS cables connects with one of the plurality of connector pin sets,
- the body being configured to at least partially obscure more than one of the plurality of connector pins from the second side to prevent the plurality of COTS cables from engaging the obscured connector pins;
- a cavity configured to retain at least two of the distal ends of the obscured connecter pins therein when the connectorized mass interconnect guide interfaces the mass interconnect, the cavity being elongated in a direction extending between the at least two of the obscured connector pins; and
- alignment geometry associated with one of the plurality of apertures, the alignment geometry being configured to receive orientation structure of one of the plurality of COTS cables thereby orienting the one of the plurality of COTS cables rotationally about a longitudinal axis of the one of the plurality of COTS cables.

10. The connectorized mass interconnect guide of claim 9, further comprising retainment structure configured to releasably secure one of the plurality of COTS cables in engagement with one of the plurality of connector pin sets.

11. The connectorized mass interconnect guide of claim 9, the partitions being configured to divide the plurality of connector pins into at least a 32 pin set.

12. The connectorized mass interconnect guide of claim 9, the partitions being configured to divide the plurality of connector pins into at least a 64 pin set.

13. The connectorized mass interconnect guide of claim 9, the partitions being configured to divide the plurality of connector pins into pin sets of different numbers of pins.

14. The connectorized mass interconnect guide of claim 9, further comprising a plurality of fastener holes extending between the opposing first and second sides for receiving fasteners therethrough to secure the connectorized mass interconnect guide to the mass interconnect.

15. A connectorized mass interconnect guide for interfacing a mass interconnect having a plurality of connector pins with a plurality of commercial off-the-shelf (COTS) cables, the connectorized mass interconnect guide comprising:

a body having:

a first flat side configured to abut the mass interconnect; and a second flat side opposite the first side;

a plurality of partitions configured to divide the plurality of connector pins into a plurality of connector pin sets including a 10 pin connector pin set, a 20 pin connector pin set, a 32 pin connector pin set, and a 64 pin connector pin set when the first side of the body abuts the mass interconnect, the plurality of partitions including:

a central partition having a first width; and a plurality of additional partitions extending perpendicularly to the central partition and each having a second width smaller than the first width, the body and the plurality of partitions forming a plurality of apertures extending between the opposing first and second sides, each one of the plurality of apertures being configured to expose one of the connector pin sets and receive one of the plurality of COTS cables from the second side so that each one of the plurality of COTS cables connects with one of the plurality of connector pin sets, the body having a substantially rectangular cuboid shape; and retainment structure configured to releasably secure one of the plurality of COTS cables in engagement with one of the plurality of connector pin sets.

16. A connectorized mass interconnect guide for interfacing a mass interconnect having a plurality of connector pins with a plurality of commercial off-the-shelf (COTS) cables, each of the plurality of connector pins including a distal end, the connectorized mass interconnect guide comprising:

a body having:

a first side configured to abut the mass interconnect; and a second side opposite the first side;

a partition configured to divide the plurality of connector pins into a plurality of connector pin sets when the first side of the body abuts the mass interconnect, the body and the partition forming a plurality of apertures extending between the opposing first and second sides, each one of the plurality of apertures being configured to expose one of the connector pin sets and receive one of the plurality of COTS cables from the second side so that each one of the plurality of COTS cables connects with one of the plurality of connector pin sets, the body being configured to at least partially obscure more than one of the plurality of connector pins from the second side to prevent the plurality of COTS cables from engaging the obscured connector pins; and retainment structure configured to releasably secure one of the plurality of COTS cables in engagement with one of the plurality of connector pin sets.

17. A connectorized mass interconnect guide for interfacing a mass interconnect having a plurality of connector pins with a plurality of commercial off-the-shelf (COTS) cables, the connectorized mass interconnect guide comprising:

a body having:

a first flat side configured to abut the mass interconnect; and a second flat side opposite the first side;

a plurality of partitions configured to divide the plurality of connector pins into a plurality of connector pin sets when the first side of the body abuts the mass interconnect, the body and the plurality of partitions forming a plurality of apertures extending between the opposing first and second sides, each one of the plurality of apertures being configured to expose one of the connector pin sets and receive one of the plurality of COTS cables from the second side so that each one of the plurality of COTS cables connects with one of the plurality of connector pin sets;

alignment geometry associated with one of the plurality of apertures, the alignment geometry being configured to receive orientation structure of one of the plurality of COTS cables thereby orienting the one of the plurality of COTS cables rotationally about a longitudinal axis of the one of the plurality of COTS cables; and retainment structure configured to releasably secure one of the plurality of COTS cables in engagement with one of the plurality of connector pin sets.

* * * * *